United States Patent
Beer et al.

(10) Patent No.: US 7,087,160 B2
(45) Date of Patent: Aug. 8, 2006

(54) OUTSIDE-IN FLOW ENGINE AND TRANSMISSION FILTER AND METHOD

(75) Inventors: Markus Beer, Morsbach (DE); James Wolford, Chicago, IL (US); Ibrahim Khalil, Barrington, IL (US); Joe Geisler, Des Plaines, IL (US); Karl Morgan, Park Ridge, IL (US); Alan Peet, Waterman, IL (US)

(73) Assignee: SPX Corporation, Charlotte, NC (US)

( * ) Notice: Subject to any disclaimer, the term of this patent is extended or adjusted under 35 U.S.C. 154(b) by 71 days.

(21) Appl. No.: 10/446,860

(22) Filed: May 29, 2003

(65) Prior Publication Data

US 2004/0237485 A1  Dec. 2, 2004

(51) Int. Cl.
*B01D 35/027* (2006.01)
*B01D 29/15* (2006.01)

(52) U.S. Cl. .............. 210/168; 210/172; 210/461; 210/489; 210/416.5; 210/486; 55/502; 156/73.1; 156/73.3; 156/73.4; 156/580.1; 156/580.2; 264/232; 264/234; 264/413; 264/DIG. 48

(58) Field of Classification Search ............... 55/385.3, 55/498, 505, 361, 363, 368, 379, 380, 502; 123/198 E; 210/168, 172, 461, 489, 416.5, 210/416.4, 486; 156/73.1, 73.3, 73.4, 580.1, 156/580.2; 264/232, 234, 413, DIG. 48
See application file for complete search history.

(56) References Cited

U.S. PATENT DOCUMENTS

| | | | | |
|---|---|---|---|---|
| 2,645,941 A | * | 7/1953 | Reid | ................. 73/863.23 |
| 2,655,221 A | * | 10/1953 | Russell | .................. 96/347 |
| 4,157,902 A | * | 6/1979 | Tokar | ................. 55/385.3 |
| 4,250,039 A | | 2/1981 | Cozzi et al. | |
| 4,889,621 A | | 12/1989 | Yamada et al. | |
| 4,995,971 A | | 2/1991 | Droste et al. | |
| 5,099,954 A | | 3/1992 | Kikuchi et al. | |
| 5,125,940 A | * | 6/1992 | Stanhope et al. | ......... 55/385.3 |
| 5,494,575 A | | 2/1996 | Kitajima et al. | |
| 5,702,237 A | * | 12/1997 | Hill | ................. 417/313 |
| 5,853,577 A | | 12/1998 | Gizowski et al. | |
| 6,096,207 A | * | 8/2000 | Hoffman et al. | ........... 210/232 |
| 6,139,737 A | | 10/2000 | Gizowski | |
| 6,190,546 B1 | * | 2/2001 | Agner | ................. 210/168 |
| 6,220,454 B1 | | 4/2001 | Chilton | |
| 6,342,084 B1 | * | 1/2002 | Pezzaniti | ................. 55/361 |
| 6,432,307 B1 | | 8/2002 | Gizowski et al. | |
| 6,451,205 B1 | * | 9/2002 | McGaw, Jr. | ............. 210/168 |
| 6,523,561 B1 | | 2/2003 | Kapcoe et al. | |

FOREIGN PATENT DOCUMENTS

| | | |
|---|---|---|
| DE | 196 10 414 | 9/1997 |
| EP | 1 306 543 | 5/2003 |
| JP | 9150022 | 6/1997 |
| JP | 9290109 | 11/1997 |

* cited by examiner

*Primary Examiner*—Minh-Chau T. Pham
(74) *Attorney, Agent, or Firm*—Baker & Hostetler LLP

(57) ABSTRACT

A suction-side transmission or engine filter includes a filter bag assembly having an outlet portion and a media bag enclosing an inner support structure, the filter bag assembly is contained at least partially within a housing having an outlet port. The outlet portion and outlet port are aligned and sealed together creating an outside-in fluid flow scheme.

15 Claims, 4 Drawing Sheets

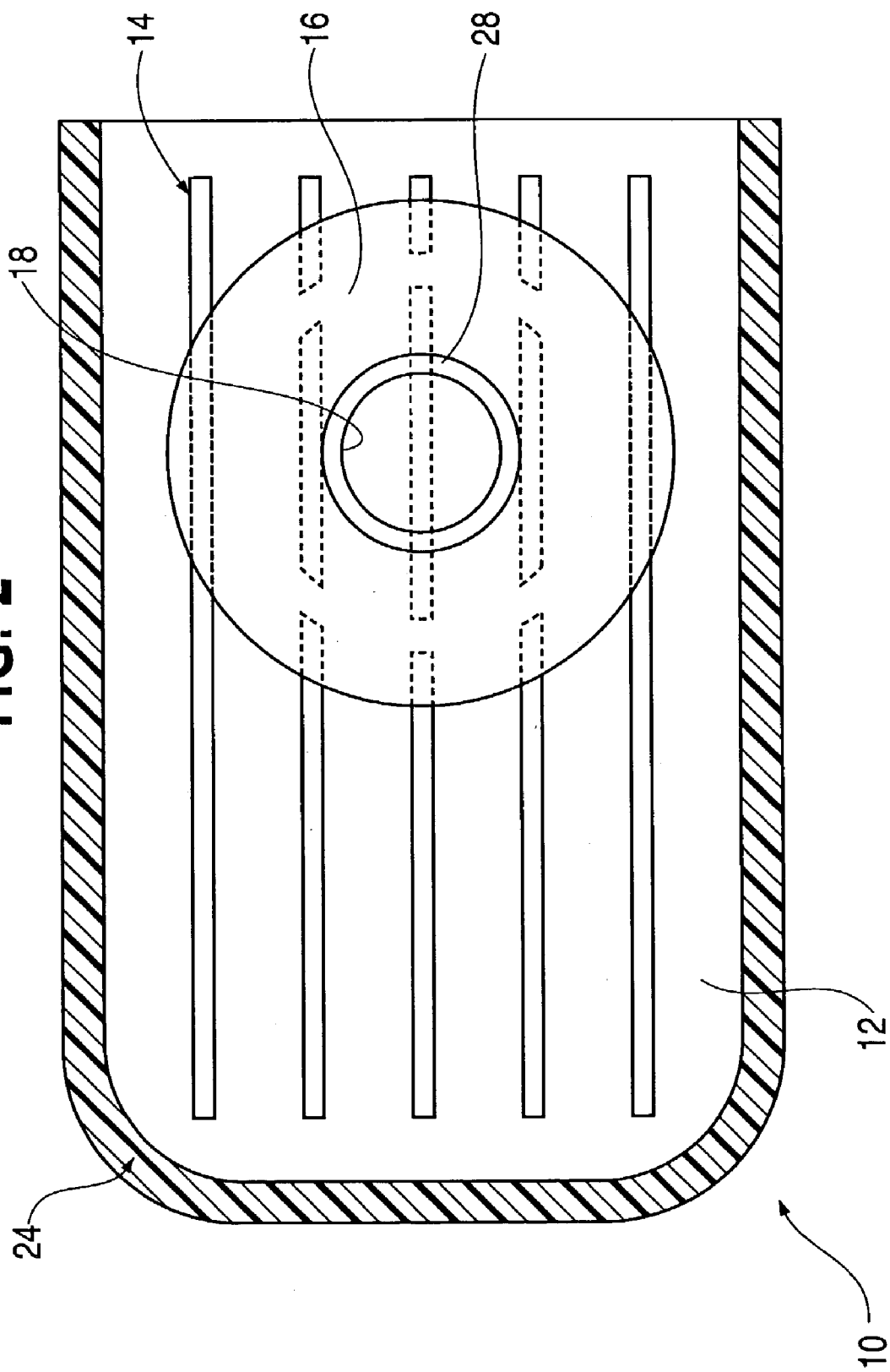

OUTSIDE-IN FLOW ENGINE AND TRANSMISSION FILTER AND METHOD

FIELD OF THE INVENTION

The present invention relates generally to engine and transmission filters. The present invention relates more specifically to suction-side engine or transmission filters having an outside-in flow scheme.

BACKGROUND OF THE INVENTION

Currently, suction-side transmission filters having a media-in-bag configuration employ the media in an inside to outside fluid flow scheme. Consequently, dirty fluid enters the bag from the transmission filter inlet and is cleaned as it exits the bag into two fluid regions (one above and one below the bag). The clean fluid then travels toward the transmission filter outlet. Typically, there is a region where the two clean flow regions join and then exit the transmission filter outlet.

Media bags with inside-out flow schemes can be difficult to incorporate into some transmission filter designs, for example, transmission filters with inlets at an angle or inlets particularly close to the side-wall of the filter. Also, transmission filters with media bags configured in an inside-out flow scheme often have areas of minimal flow, that is substantial portions of the media area are not fully utilized. Such inside-out flow transmission filters are thus less efficient than they could be if there were more uniform flow throughout the media.

Accordingly, it is desirable to provide more flexible and/or more efficient transmission filters having a media-in-bag configuration. In other words, it is desirable to provide transmission filters having a media-in-bag configuration that can be incorporated into a greater number of transmission filter designs, for example also those transmission filters having inlets at an angle or inlets particularly close to the side-wall of the filter. It is also desirable to provide a transmission filter that utilizes as much of the media as possible.

SUMMARY OF THE INVENTION

The foregoing needs are met, to a great extent, by the present invention, wherein in one aspect an apparatus is provided that in some embodiments includes a filter bag assembly incorporated into a transmission or engine filter housing to create an outside-in fluid flow scheme. Some embodiments of transmission or engine filters having such a flow scheme may be more flexible than inside-out transmission or engine filters in that they may be adapted to fit a larger number of filter designs. Some embodiments of transmission or engine filters having an outside-in flow scheme may alternatively, or in addition, have the advantage of being more efficient than inside-out transmission filters in that they more fully utilize the media.

In accordance with one embodiment of the present invention, a filter bag assembly is provided that includes a media bag with an outlet, the outlet is configured to attach, and preferably seal, to the outlet port of a transmission or engine filter, thereby forming an outside-in flow scheme. The media bag outlet can be fitted with an outlet tube, which on one end is sealed to the media bag outlet and on the other end is configured for attachment, directly or indirectly, to the transmission pump or engine oil pump. An example of indirect attachment includes an embodiment in which the outlet tube is sealed to the transmission filter outlet, and the transmission filter outlet is configured to attach, or preferably seal, to the transmission pump. In some embodiments of the filter bag assembly, the media bag at least partially encloses a support frame.

In accordance with another embodiment of the present invention, a transmission or engine filter is provided which includes: a transmission or engine filter housing having an outlet port, and a filter bag assembly having a media bag with an outlet portion. The filter bag assembly is positioned, at least partially, within the transmission or engine filter to align and attach together the outlet port with the outlet portion thereby creating an outside-in flow scheme. By "at least partially," it is understood that in typical embodiments the media bag is located within the housing but portions of the filter bag assembly, for example an optional outlet tube, may extend outside the filter housing. Thus, in some embodiments the transmission or engine filter housing includes a fixing ring extending from the outlet port and the media bag outlet tube extends through the fixing ring and is sealed against the fixing ring.

In accordance with still another embodiment of the present invention, a transmission or engine filter is provided which includes means for filtering fluid and means for housing the fluid filtering means; the fluid filtering means and the housing means are configured together to form an outside-in flow scheme.

In accordance with yet another embodiment of the present invention, a method of making a suction-side transmission or engine filter is provided, wherein an oil pan, a filter bag assembly having an outlet portion, and an upper cover having an outlet is provided. The filter bag assembly is positioned on the oil pan, and the upper cover is positioned over the filter bag assembly so that the outlet portion and outlet port align. According to some embodiments, the upper cover and oil pan are welded together to from a housing, at least partially enclosing the filter bag assembly within the housing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a top view of the filter bag assembly of FIG. 1.

DETAILED DESCRIPTION

Figure 1:
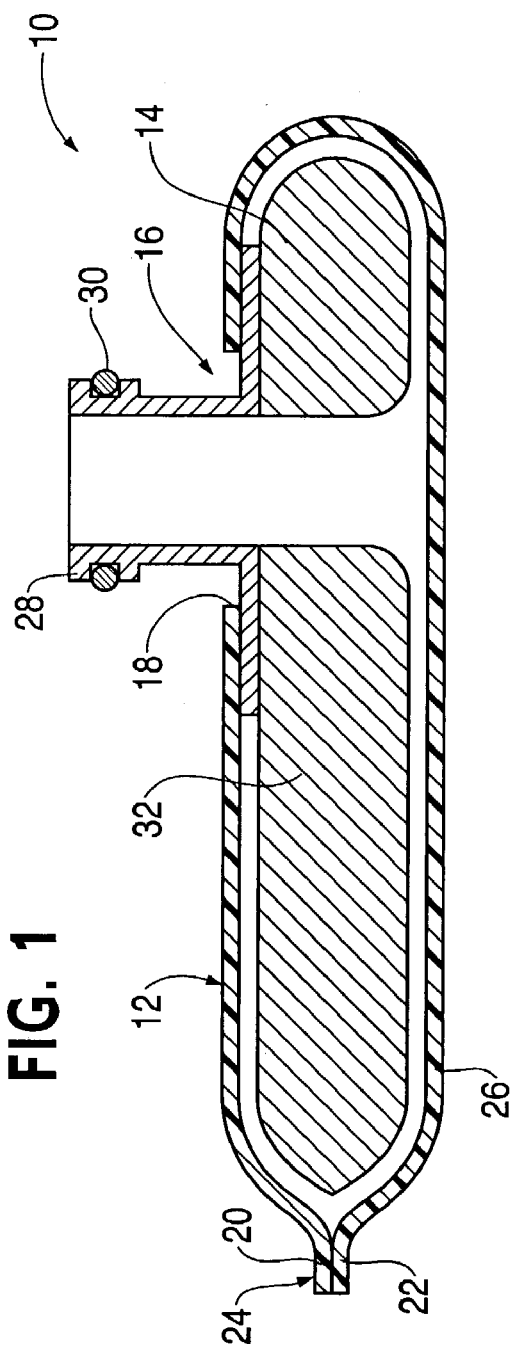
FIG. 1 is a cross-section view illustrating a filter bag assembly according to a preferred embodiment of the invention.

The invention will now be described with reference to the drawing figures, in which like reference numerals refer to like parts throughout. An embodiment in accordance with the present invention provides a suction-side transmission or engine filter comprising a filter bag having an inner support frame and filter bag outlet coincident with the outlet port of the transmission or engine filter.

The suction-side transmission or engine filters according to the present invention provide an outside-in flow scheme, i.e. dirty fluid enters the transmission or engine filter through the transmission or engine filter intake port and exists outside the filter bag. The dirty fluid is "purified" by passing through the filter media into the inside of the filter bag. The purified liquid then flows from the inside of the filter bag directly through the filter bag outlet, which is coincident with the transmission or engine filter outlet port, to the transmission pump in the case of a transmission filter and to the engine oil pump in the case of an engine filter.

By contrast, according to inside-out flow schemes, dirty fluid entering the transmission or engine filter flows through the transmission or engine filter intake port, which is coincident with the filter bag inlet, directly into the inside of the filter bag. The dirty fluid is "purified" by passing through the filter media to the outside of the filter bag. By "purified" it should be understood that the fluid is not necessarily completely rid of impurities, but rather the degree of purification depends, for example, in part on the choice of filtering media. Thus, the term "purified" is intended to mean simply that fluid, which has passed through the filter media is cleaner than fluid entering the transmission or engine filter prior to having passed through the filter media.

Embodiments according to an outside-in configuration may provide one or more advantages as compared to prior art inside-out configurations. For example, in some outside-in embodiments, the fluid is divided into only two regions (outside the bag and inside the bag), which regions do not intermix. That is, fluid can completely surround the filter bag and then proceed toward the transmission or engine filter outlet after passing through the filter media. By contrast, there can be lost flow areas in filter pans manufactured according to inside-out configurations. That is, there can be substantial portions of the media in inside-out configurations that are not fully utilized.

As another example, according to some embodiments, the filter bag for transmission or engine filters manufactured according to outside-in configurations, can be manufactured separately from the rest of the transmission or engine filter. Consequently, efficiencies and cost-savings can be gained because a particular outside-in filter bag design may be common to several different outside-in transmission or engine filter designs.

As yet another example of an advantage that may be associated with some embodiments according to the present invention, improved quality may be associated with the manufacture of outside-in, suction-side transmission or engine filters. For example, in some embodiments, construction of a transmission or engine filter having a filter bag with an outside-in flow scheme separates the sealing of the filter bag from the sealing of the transmission or engine filter into distinct manufacturing steps. Currently, for both composite and all-plastic filters, the sealing of the filter bag and the sealing of the filter occurs simultaneously. Separating the sealing steps provides opportunity to implement additional care and process checks for improving quality.

As yet another example of a potential advantage that may be associated with some embodiments according to the present invention, for some filter designs, an outside-in flow scheme may be more easily implemented. Specifically, in some outside-in designs, the filter bag assembly is connected to the filter body at the filter outlet. For some filter designs, e.g. filters with inlets at an angle or with inlets particularly close to the side-wall of the filter, it is difficult to employ an inside-out filter bag design.

For ease in description, the embodiments described hereinafter are referred to as transmission filters or suction-side transmission filters. The description which follows, however is equally applicable to engine filters, particularly suction-side engine filters. A person of ordinary skill in the art, from the teachings herein, should understand that the embodiments described can be adapted for use as engine filters, and particularly suction-side engine filters. An embodiment of a filter bag assembly 10 in accordance with the present invention is illustrated in cross-section in FIG. 1. The filter bag assembly 10 includes: a media bag 12, an inner support frame 14, and a media bag outlet 16.

The media bag 12 is formed from a single, continuous piece of filtering material 26. The filtering material 26 is configured into a bag having an outlet portion 18 by folding the filter material 26 and then sealing the resultant opposing sides 20, 22 into a media joint 24. The outlet portion 18 is not sealed, to maintain a pathway for the fluid to flow directly from the interior of the filter bag assembly 10 to the transmission pump (not shown). Suitable methods of sealing are known to persons of ordinary skill in the art, and any of those suitable methods may be used. For example, the open sides may be sealed by either a welding or bonding process.

The inner support frame 14 is positioned within the media bag 12 to provide support to the filtering material 26; thus helping prevent collapse of the media bag 12 due to, for example, fluid pressure and/or suction. Preferably, the inner support frame 14 is constructed so that fluid flowing from any direction into the media bag 12 can still flow out of the media bag 12 through the outlet portion 18. In the embodiment illustrated, the inner support frame includes molded ribs, also known as flow ribs 32.

The filter bag outlet 16 includes an outlet tube 28, and preferably an outlet seal 30. The filter bag outlet 16 is attached to the media bag 12 at the outlet portion 18.

FIG. 2 shows the embodiment of FIG. 1, and specifically the media joint 24, the inner support frame 14, outlet tube 28 of the filter bag outlet 16, and outlet portion 18 of the media bag 12 from a top view perspective.

Figure 3:
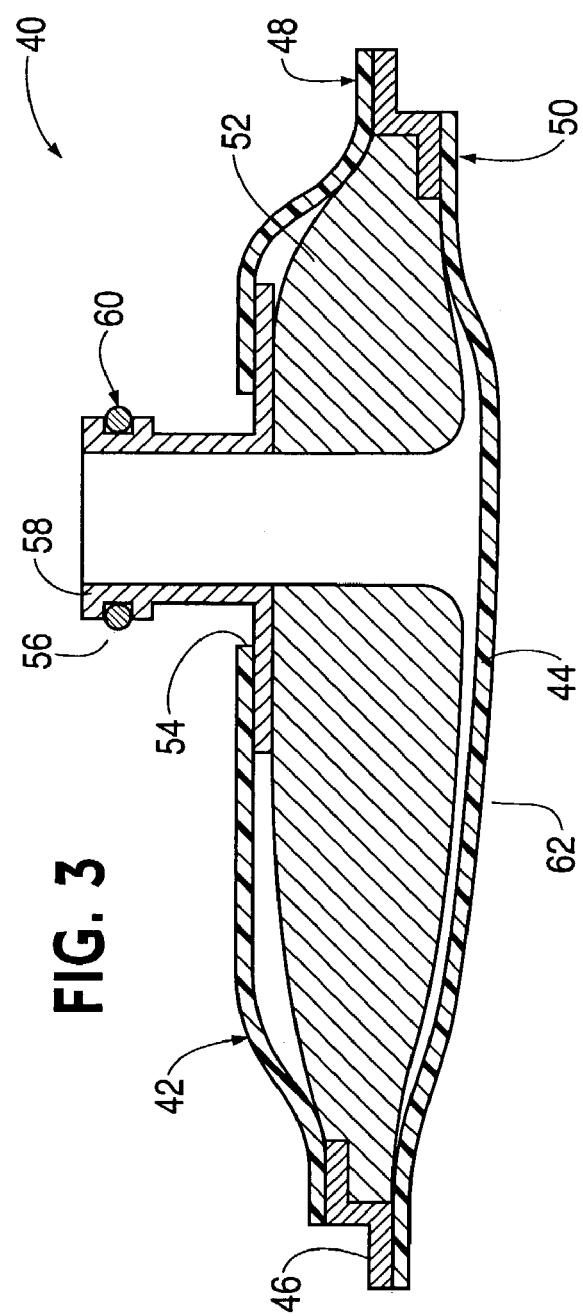
FIG. 3 is a cross-sectional view of a filter bag assembly according to another embodiment of the present invention.

FIG. 3 depicts an alternative embodiment of a filter bag assembly 40 according to the present invention. This alternative embodiment is similar to that depicted in FIG. 1, except that multiple pieces of filtering material 42, 44 are used, and the media bag 62 is formed by sealing the filtering material 42, 44 against a spacer segment 46 to form media joints 48, 50, rather than against itself. The spacer segment 46 can be integral with the inner support frame 52, and in such embodiments, the filtering material 42, 44 is consequently sealed to at least portions of the inner support frame 52.

Although the embodiment of FIG. 3 depicts a media bag 62 formed from two pieces of filtering material 42, 44, additional pieces of filtering material could also be used. In such embodiments, the additional pieces of filtering material could be sealed directly against other pieces of filtering material, as in the embodiment depicted in FIG. 1. Likewise, in the embodiment of FIG. 1, additional pieces of filtering material could be used, but these additional pieces should be sealed against each other to maintain separation of the dirty and purified fluid.

As in the embodiment of FIG. 1, the embodiment depicted in FIG. 3 includes a media bag outlet portion 54, transmission filter outlet 56, and inner support frame 52. The transmission filter outlet 56 includes an outlet tube 58, and optionally a seal 60, and is attached to the filtering material 42 at the media bag outlet portion 54.

Figure 4:
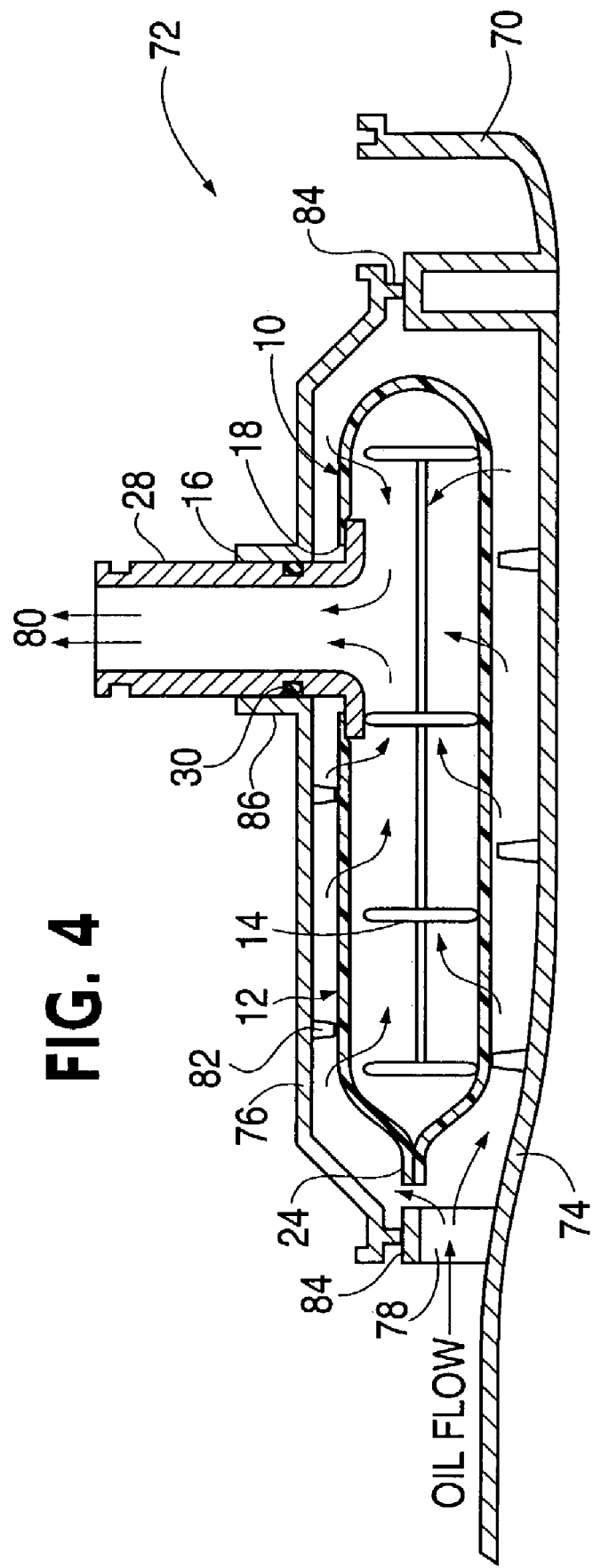
FIG. 4 is a cross-sectional view of an outside-in flow transmission filter in accordance with an embodiment of the present invention.

FIG. 4 illustrates a filter bag assembly 10 incorporated into a pan filter 70, forming a transmission filter 72. Consequently, the filter bag assembly 10 includes media bag 12 sealed at the media joint 24, attached at the outlet portion 18 to a filter bag outlet 16 comprising an outlet tube 28 and optional seal 30, and enclosing an inner support frame 14.

The pan filter 70 includes an oil pan 74, transmission filter upper cover 76, filter suction inlet 78, a filter suction outlet 80, and spacers, or fixation and distance pins, 82. The upper cover 76 is attached to the oil pan 74, for example by welding forming a weld joint 84. The upper cover includes a fixing ring 86, defining the filter suction outlet 80, and through which the filter bag outlet tube 28 passes. In this embodiment, fluid enters the transmission filter 70 through the filter suction inlet 78, can flow around the filter bag assembly 10, enters into the inside of the filter bag assembly 10 through the filtering material 26, and exits the transmission pan filter 70 through the outlet tube 28.

Figure 5:
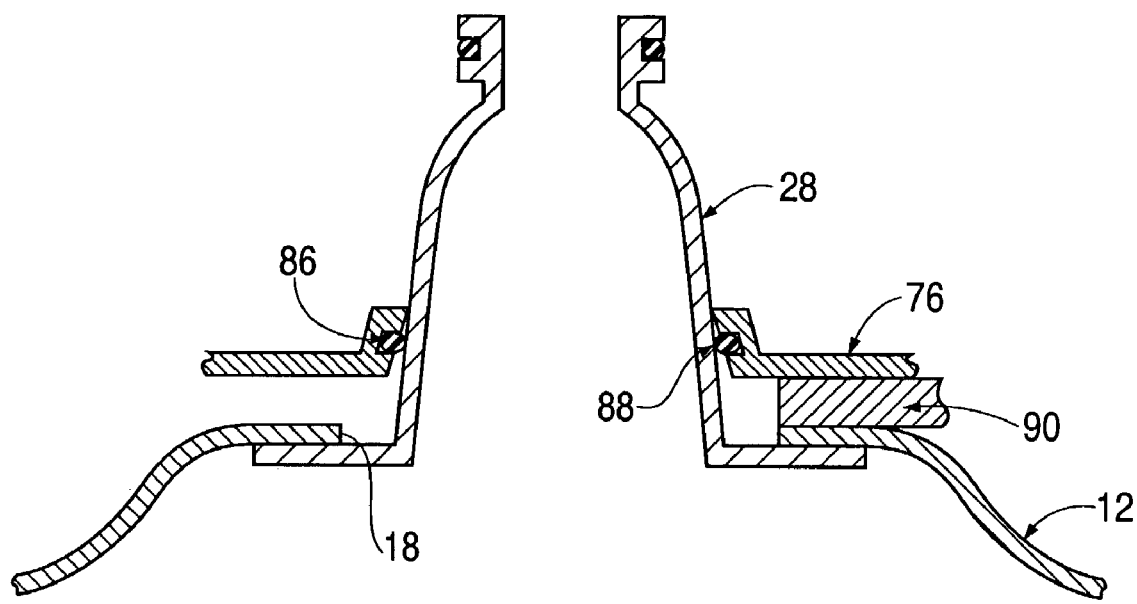
FIG. 5 is a cross-sectional detail view of the outlet port of the outside-in flow transmission filter shown in FIG. 4.

In the embodiment depicted in FIG. 4, the outlet tube 28 is directly connected to the transmission pump (not shown). FIG. 5 is a blown-up view of the connection region. As shown in FIG. 5, the upper cover 76 includes a fixing ring 86 that extends above the surface of the upper cover 76 but below the top of the outlet tube 28. Also as shown, the fixing ring includes a seal 88 which presses against the outlet tube 28. Alternatively, the seal 88 could be positioned in the outlet tube 28 to press against the fixing ring 86. The connection also includes an upper cover rib 90 positioned between the upper cover 76 and the filter media 12 at the outlet portion 18.

Figure 6:
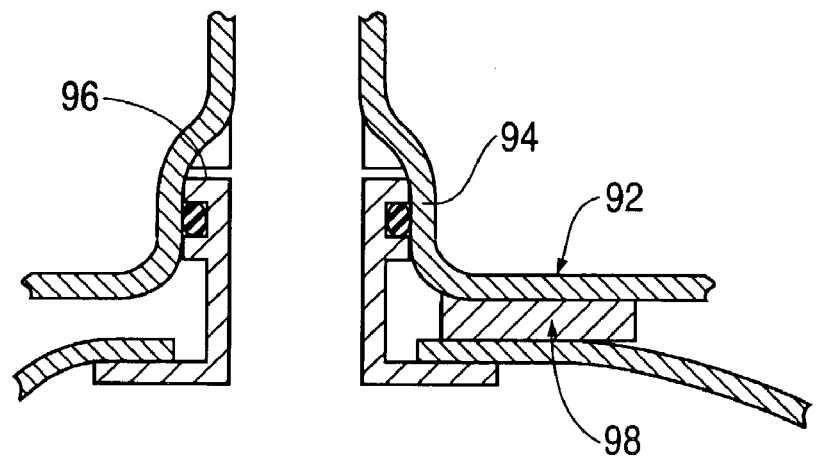
FIG. 6 is a cross-sectional detail view of another embodiment of an outlet port of an outside-in flow transmission filter in accordance with the present invention.

FIG. 6 illustrates an alternative configuration for connecting transmission filters in accordance with the present invention to a transmission pump. In contrast to the embodiment illustrated in FIG. 5, in this case the fixing ring 94, rather than ending before the top of the outlet tube 96, extends beyond the top of the outlet tube 96. Consequently, the upper cover 92 is connected to the transmission pump. The upper cover 92 can optionally include a seal (not shown) for a more secure fit. As with the embodiment shown in FIG. 5, the embodiment of FIG. 6 includes an upper cover rib 98 positioned between the upper cover 92 and the outlet tube 96.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A bag filter assembly for filtering a liquid used in a transmission or engine, comprising:
   a media bag comprising at least one piece of filtering material, the bag forming a substantially flat bag envelope having an inside, an outside, a substantially flat top portion, a substantially flat bottom portion, and an outlet portion on the top portion, the outlet portion further comprising an outlet tube and an outlet seal disposed on the outlet tube, the outlet portion configured for attachment, directly or indirectly, to a transmission or engine filter outlet portion;
   a spacer segment that joins at least one edge of the top portion and the bottom portion; and
   a support structure positioned inside of the bag envelope between the top portion and the bottom portion maintain an internal space between the top portion and the bottom portion wherein the support structure comprises ribs.

2. The bag filter assembly of claim 1, further comprising a filter bag outlet configured at a first end to connect directly or indirectly to a transmission pump or engine oil pump, and attached at a second end to the bag at the outlet portion.

3. The bag filter assembly of claim 1, wherein the filter media is a single piece of filtering material folded upon itself and sealed to form a media joint.

4. The bag filter assembly of claim 1, wherein the support structure comprises a material chosen from a pillow-shaped porous body, expanded metal, and a plastic flattened tube with holes.

5. The bag filter assembly of claim 1, wherein the media bag further comprises a spacer having a top side and a bottom side, wherein the filter media further comprises a first piece and a second piece of filtering material, and wherein the first piece of filtering material is sealed to the top side of the spacer and the second piece of filtering material is sealed to the bottom side of the spacer.

6. The bag filter assembly of claim 5, wherein the spacer is integral with the support structure.

7. A transmission or engine filter for filter a liquid, comprising:
   a transmission or engine filter housing, wherein the housing comprises an oil pan attached to a filter upper cover, and includes an intake port and an outlet port; and,
   a filter bag assembly comprising, a media bag comprising at least one piece of filtering material, the bag forming a substantially flat bag envelope having an inside, an outside, a substantially flat top portion, a substantially flat bottom portion, and an outlet portion on the top portion, the outlet portion further comprising an outlet tube and an outlet seal disposed on the outlet tube, the outlet portion configured for attachment, directly or indirectly, to a transmission or engine filter outlet portion;
   a spacer segment that joins at least one edge of the top portion and the bottom portion; and a support structure positioned inside of the bag envelope between the top portion and the bottom portion maintain an internal space between the top portion and the bottom portion wherein the support structure comprises ribs, and wherein the filter bag assembly is positioned at least partially within the housing to form an outside-in flow scheme.

8. The transmission or engine filter of claim 7, wherein the filter bag outlet is aligned with the outlet port, and the filter bag outlet and the outlet port are sealed together.

9. The transmission or engine filter of claim 8, wherein the filter bag assembly further comprises an outlet tube attached to the filter bag outlet.

10. The transmission or engine filter of claim 9, wherein the outlet tube is coincident with the outlet port and is sealed to the outlet port.

11. The transmission or engine filter of claim 10, wherein the outlet port further comprises a fixing ring and the outlet tube extends into or through the fixing ring and is sealed against the fixing ring.

12. The transmission or engine filter of claim 7, wherein the oil pan and the upper cover comprise a plastic material.

13. The transmission or engine filter of claim 7, wherein the transmission or engine filter has a composite construction.

14. A transmission or engine filter for filtering liquid, comprising:
   means for filtering fluid a media bag comprising at least one piece of filtering material, the bag forming a substantially flat bag envelope having an inside, an outside, a substantially flat top portion, a substantially flat bottom portion, and an outlet portion on the top portion, the outlet portion further comprising an outlet tube and an outlet seal disposed on the outlet tube, the outlet portion configured for attachment, directly or indirectly, to a transmission or engine filter outlet portion;
   means for joining at least one edge of the top portion and the bottom portion;
   means for supporting, positioned inside of the bag envelope between the top portion and the bottom portion to maintain an internal space between the top portion and the bottom portion wherein the support structure comprises ribs; and
   a means for housing the fluid filtering means, wherein the housing means and fluid filtering means are configured together to form an outside-in flow scheme.

15. A method of making a suction-side transmission or engine filter for filtering a vehicle liquid, comprising:
   positioning a filter bag assembly on an oil pan, wherein the filter bag assembly comprises a media bag having at least one piece of filtering material, the bag forming a substantially flat bag envelope having an inside, an outside, a substantially flat top portion, a substantially flat bottom portion, and an outlet portion on the top portion, the outlet portion further comprising an outlet tube and an outlet seal disposed on the outlet tube, the outlet portion configured for attachment, directly or indirectly, to a transmission or engine filter outlet portion, and a support structure positioned in side of the bag envelope between the top portion and the bottom portion to maintain an internal space between the top portion and the bottom portion wherein the support structure comprises ribs;
   joining a spacer segment to at lease one edge of the top portion and the bottom portion;
   positioning an upper cover having an outlet port over the filter bag assembly to align the outlet port and the outlet portion;
   welding the upper cover to the oil pan filter; and
   sealing the outlet port and the outlet portion together.

* * * * *